United States Patent [19]

Mazzorana

[11] 4,178,805
[45] Dec. 18, 1979

[54] STARTERS FOR INTERNAL COMBUSTION ENGINE

[75] Inventor: Alfred Mazzorana, Venissieux, France

[73] Assignee: Societe de Paris et du Rhone, Lyons, France

[21] Appl. No.: 868,635

[22] Filed: Jan. 11, 1978

[30] Foreign Application Priority Data

Jan. 17, 1977 [FR] France .................. 77 01827

[51] Int. Cl.$^2$ .................. F02N 15/06; F16D 41/06
[52] U.S. Cl. .................. 74/6; 192/45
[58] Field of Search ............ 74/6, 7 R, 7 A; 192/42, 192/45

[56] References Cited

U.S. PATENT DOCUMENTS

| | | | |
|---|---|---|---|
| 1,828,359 | 10/1931 | Chryst | 74/6 |
| 2,706,412 | 4/1955 | Toulier | 74/6 |
| 3,460,655 | 8/1969 | Bowcott | 74/6 X |
| 3,965,754 | 6/1976 | Bowcott | 74/6 |

FOREIGN PATENT DOCUMENTS

| | | | |
|---|---|---|---|
| 815277 | 10/1951 | Fed. Rep. of Germany | 74/6 |
| 923883 | 2/1955 | Fed. Rep. of Germany | 74/7 A |
| 1343847 | 10/1963 | France . | |
| 994887 | 6/1965 | United Kingdom . | |

Primary Examiner—Allan D. Herrmann
Attorney, Agent, or Firm—Dowell & Dowell

[57] ABSTRACT

In an engine starter gearing comprising a pinion and a sleeve which are connected by an overrunning clutch, the pinion has a tubular extension which is rotatably received within an axial bore portion of the sleeve in order to center the outer casing of the said clutch which is solid with the pinion, with respect to the inner race of said clutch which is formed on the sleeve, independently of the shaft on which the pinion and sleeve are supported.

2 Claims, 6 Drawing Figures

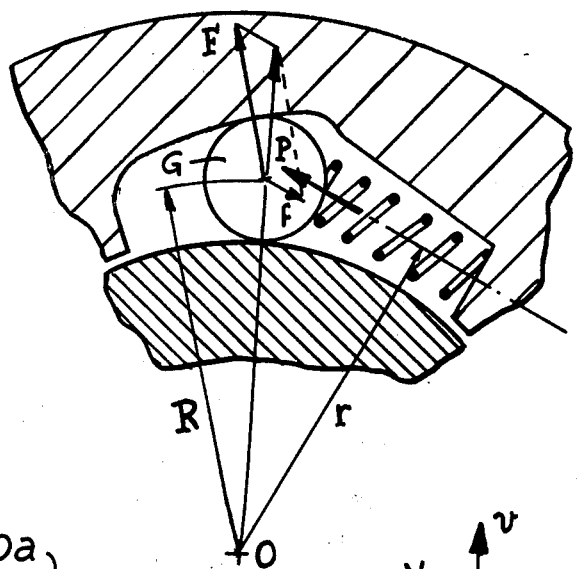
Fig. 1
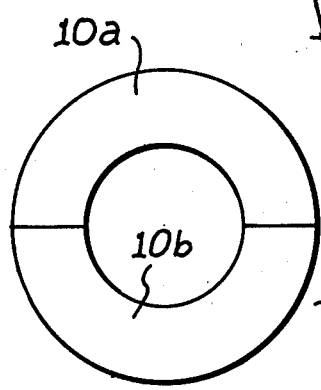
Fig. 6
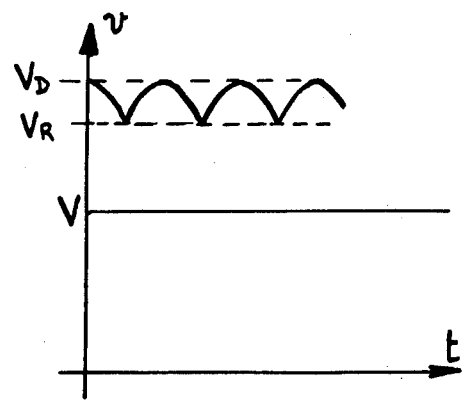
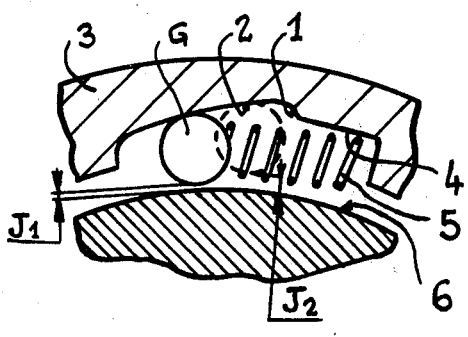
Fig. 3
Fig. 2

STARTERS FOR INTERNAL COMBUSTION ENGINE

The present invention relates to electric starters for internal combustion engines and it more particulary concerns the gearing which connects the electric motor with the engine during the starting period.

This gearing conventionally comprises a sleeve having inner ribs to cooperate with the splined end of the electric motor shaft, a pinion adapted to mesh with a toothed ring provided on the flywheel of the engine to be started and an overrunning clutch or "free-wheel" to connect the pinion with the sleeve. The sleeve itself is generally formed with an outer circular groove by means of which it may be axially displaced by a manually or electromagnetically actuated forked member.

The overrunning clutch generally includes an inner annular surface or race carried by the pinion and an outer casing carried by the sleeve, this casing being formed with a plurality of inner depressions or chambers, each enclosing a roller which is urged by a spring towards a position at which it is frictionally locked between the annular race and the inclined outer wall of the chamber.

It has been proposed to make the outer casing of the overrunning clutch solid with the pinion, the inner race being provided on the sleeve. Such an arrangement is described in British specification No. 994 887. It has a number of advantages with respect to the conventional arrangement in that when the pinion is driven at a high speed by the engine, the rollers are urged outwardly by centrifugal force, which promotes and maintains their disengagement from their locking position. But experience has demonstrated that the outer casing then has a tendency to become decentered with respect to the inner race. In fact the casing and the inner race are only retained in mutual co-axial relation by the electric motor shaft, i.e. by a third part, which means that the machining clearances between this third part and each of the first and second ones add their respective effects between the said first and the second parts. The result is that the locking rollers wear out too rapidly.

It is an object of the present invention to eliminate this disadvantage.

In accordance with this invention, in an engine starter gearing of the kind above referred to, wherein the outer casing of the overrunning clutch is solid with the pinion, the latter has a tubular extension which is rotatably disposed in a smooth bore formed in the portion of the sleeve which carries the inner race of the said clutch.

In the annexed drawings:

FIG. 1 is a fragmental section of an overrunning clutch with frictionally locking rollers, one of the latter being shown at its locked position.

FIG. 2 is an explanatory diagram concerning the operation of such a clutch as conventionally used in the art.

FIG. 3 is a view similar to FIG. 1, but showing the roller at its disengaged position.

FIG. 6 is a view of two semicircular washers of the cover member on a reduced scale.

Figure 4:
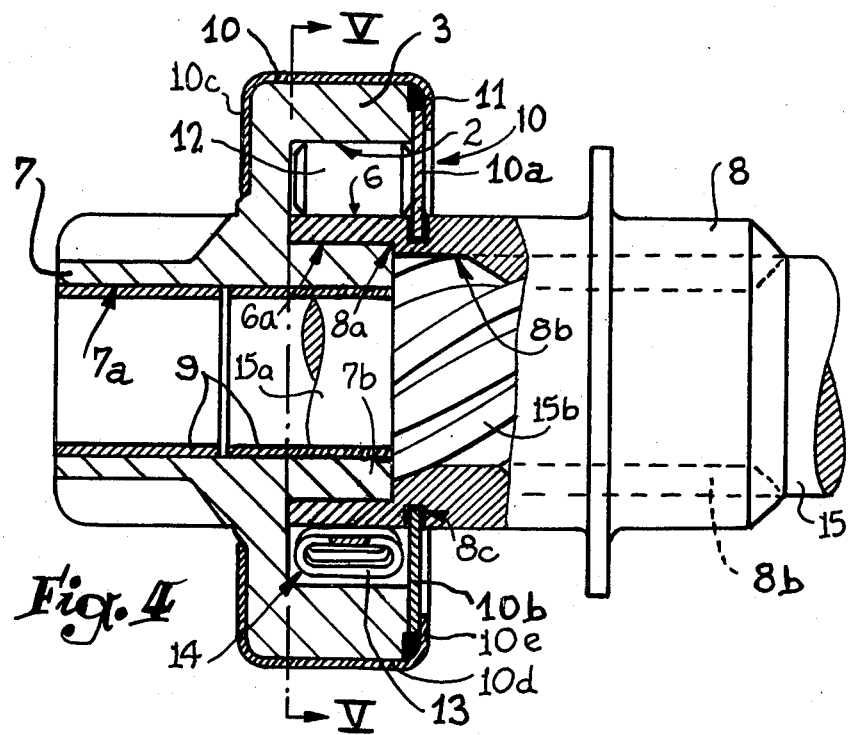
FIG. 4 is a side view with parts in section illustrating the starter gearing embobying the clutch of FIGS. 1 to 3.

Referring to FIGS. 1 and 3, an overrunning clutch of the kind in question generally comprises a plurality of inwardly opening chambers formed in an outer casing to receive a spring-pressed roller adapted to cooperate with an inner race. The chamber shown comprises a rear abutment 1, an inclined outer wall 2 formed in the hollow cylindrical outer casing 3 provided of sufficient thickness for this purpose, and an extension 4 to receive the spring 5 adapted to act on the locking roller G disposed between the inclined wall 2 and the inner race 6.

It should be noted that with such a clutch there exists a declutching speed $V_D$ at which the centrifugal force applied to each roller G determines a component f parallel to the line of action of the spring 5 and slightly higher than the pressure P exerted by the latter on the roller. As to the maximum speed V of the electric motor itself, it varies of course with the voltage of the storage battery. Considering the conventional arrangement wherein the outer casing 3 is carried by a sleeve rotating with the electric motor shaft while the inner race is formed on the side of the pinion, two cases may occur:

(1°) $V_D < V$—The rollers are permanently disengaged from the inner race as soon as the engine is started. The overrunning clutch remains loose as indicated in FIG. 2 wherein J1 designates the clearance which then appears between each roller G and the inner race 6.

(2°) $V_D > V$—Then as soon as the engine is started it tends to rotate pinion 7 together with the inner race 6, with the outer casing 3 and with the electric motor shaft at a speed $V_M$ well above $V_D$. But when $V_D$ is reached, the rollers become disengaged; however since the electric motor tends to assume under no-load conditions the speed V lower than $V_D$, the outer casing 3 decelerates progressively and when it reaches a speed $V_R$ somewhat lower than $V_D$, the rollers become re-engaged by their springs 5. The outer casing then accelerates with the electric motor shaft and so on. FIG. 2 illustrates the undulating speed thus imparted to the outer casing. These successive disengagements and re-engagements of the rollers cause a rapid wearing of the latter and of the surfaces with which they cooperate. The operating life of the gearing is thus unduly limited.

This disadvantage is eliminated when, as aforesaid, the outer casing is made solid with the pinion, the inner race being provided on the sleeve. But as noted the outer casing is then insufficiently centered.

Figure 5:
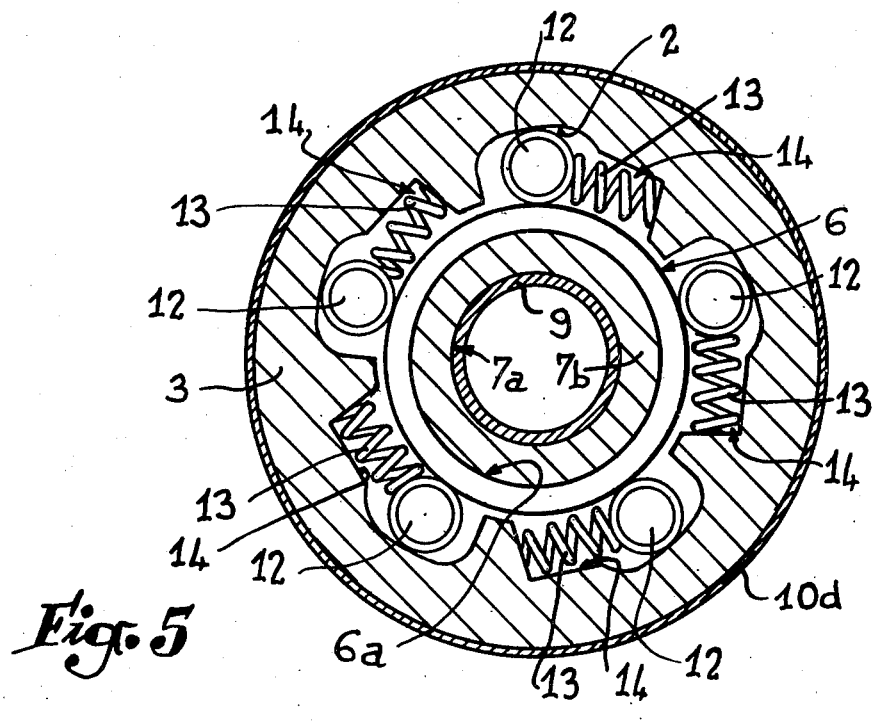
FIG. 5 is a transverse section taken along line V—V of FIG. 4.

In the embodiment according to the invention and illustrated in FIGS. 4 and 5, the outer casing 3 is solid with the pinion 7, while the inner race 6 is formed on the periphery of one end of the sleeve 8. Pinion 7 has an axial bore 7a provided with two successive bushes 9 by means of which it is rotatably and slidably mounted on a smooth extension 15a of the electric motor shaft 15. An annular U-shaped cover 10 surrounds casing 3, one of its inner edges being slidably engaged in a narrow groove 8c formed on the periphery of sleeve 8 to axially retain the latter and the pinion-and-casing unit 7-3. The cover 10 comprises a first branch 10c and a second branch 10d disposed at the periphery of the cup-shaped member 3, said second branch having a free edge 10e. Cover 10 is preferably made of a main angled portion and of two semi-circular washers 10a, 10b, FIG. 6, which are applied against the corresponding side of casing 3 by the turned down free edge 10e of the cover 10. Reference numeral 11 designates a seal interposed between the main portion 10 and the corresponding side of casing 3 along the outer edge of washers 10a, 10b.

As illustrated, pinion 7 is formed with a tubular extension 7b which is rotatably disposed with a quite limited clearance in a smooth enlarged bore 6a provided in the portion of sleeve 8 which corresponds to the inner race 6, this bore being delimited by a shoulder 8a.

Apart from bore 6a, sleeve 8 is otherwise formed with inner ribs 8b to cooperate with a splined portion 15b of the electric motor shaft 15 in the conventional manner.

The overrunning clutch itself is realized as diagrammatically illustrated in FIGS. 1 and 3. The locking rollers are here referenced 12 and their springs 13, while reference numeral 14 designates the extension adapted to receive each of these springs in each chamber.

With the arrangement described the pinion-and-casing unit 7-3 is directly centered within the bore 6a of sleeve 8 independently of the clearances which may appear between the electric motor shaft and the said parts 7-3 and 8. The operation of the locking rollers 12 is thus greatly improved.

I claim:

1. A starter gearing adapted to be mounted on the end of the shaft of an electric motor to cooperate with a toothed ring carried by the flywheel of an internal combustion engine, the said shaft having a splined portion followed by a smooth portion, said gearing comprising:
    a pinion having a smooth axial bore, said pinion carrying a co-axial lateral outwardly cup-shaped member formed with inwardly opening chambers each having an outer wall at a small angle with respect to the corresponding radii, with said member thus constituting the outer casing of an overrunning clutch of the spring-pressed roller type;
    a sleeve having inner ribs, one end of said sleeve being disposed in said cup-shaped member with the periphery of said one end forming the inner race of said clutch;
    means to axially retain said sleeve and said pinion with respect to each other;
    rollers each disposed within each one of said chambers;
    and springs each disposed in one of said chambers to urge the corresponding roller towards a position at which it simultaneously engages said inner race and the outer wall of said one of said chambers;
    said sleeve having a smooth axial bore portion at said one end and said pinion being formed with a tubular extension which is rotatably received within said smooth axial bore portion to center said outer casing with respect to said inner race.

2. In a starter gearing as claimed in claim 1, said cup-shaped member having a first lateral side facing said pinion, a periphery and a second lateral side, and said means to axially retain said pinion and said sleeve being formed of an annular cover comprising:
    a main portion having an angled longitudinal section with a first branch disposed radially against the first lateral side of said cup-shaped member and with a second branch disposed on the periphery of said cup-shaped member, said second branch having a free edge;
    and two semi-circular washers disposed against the second side of said cup-shaped member, each of said washers having an outer edge and an inner edge;
    the free edge of the second branch of said main portion being turned down over the outer edges of said semi-circular washers;
    and said sleeve having a peripheral groove to slidably receive the inner edges of said semi-circular washers.

* * * * *